(12) United States Patent
Satake et al.

(10) Patent No.: US 11,767,637 B2
(45) Date of Patent: Sep. 26, 2023

(54) POWDER COLLECTION UNIT AND FIBER PROCESSING APPARATUS

(71) Applicant: SEIKO EPSON CORPORATION, Tokyo (JP)

(72) Inventors: Akihiro Satake, Nagano (JP); Hiroshi Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 17/646,001

(22) Filed: Dec. 27, 2021

(65) Prior Publication Data

US 2022/0205180 A1 Jun. 30, 2022

(30) Foreign Application Priority Data

Dec. 28, 2020 (JP) .................. 2020-219607

(51) Int. Cl.
*D21D 5/06* (2006.01)
*D21B 1/06* (2006.01)
*D21F 1/66* (2006.01)
*D21B 1/10* (2006.01)

(52) U.S. Cl.
CPC .............. *D21D 5/06* (2013.01); *D21B 1/061* (2013.01); *D21B 1/10* (2013.01)

(58) Field of Classification Search
CPC .. D21D 5/06; D21B 1/061; D21B 1/10; D21F 1/66; D21F 9/00; Y02W 30/64

USPC ........................................................ 209/150
See application file for complete search history.

(56) References Cited

U.S. PATENT DOCUMENTS 9,845,206 B1* 12/2017 Baranovski ............. B05B 7/144
2014/0027075 A1* 1/2014 Yamagami ............. D21B 1/063
162/4

FOREIGN PATENT DOCUMENTS

JP 2008289953 A * 12/2008
JP 2009-061385 A 3/2009
JP 2009061385 A * 3/2009
JP 2012-144819 A 8/2012

* cited by examiner

*Primary Examiner* — Gene O Crawford
*Assistant Examiner* — Muhammad Awais
(74) *Attorney, Agent, or Firm* — Global IP Counselors, LLP

(57) ABSTRACT

A powder collection unit includes a powder storage having an inlet through which powder including fibers enters and an outlet through which the powder exits, a delivery screw having an elongated shape, disposed in the powder storage, and configured to rotate about a rotation axis to send out and discharge the powder through the outlet, and a powder collection portion coupled to the outlet and having an inner space that collects the powder discharged through the outlet. An end portion of the delivery screw that is adjacent to the outlet protrudes outwardly from the powder storage through the outlet and resides in the inner space of the powder collection portion.

10 Claims, 5 Drawing Sheets

POWDER COLLECTION UNIT AND FIBER PROCESSING APPARATUS

The present application is based on, and claims priority from JP Application Serial Number 2020-219607, filed Dec. 28, 2020, the disclosure of which is hereby incorporated by reference herein in its entirety.

BACKGROUND

1. Technical Field

The present disclosure relates to a powder collection unit and a fiber processing apparatus.

2. Related Art

A known sheet manufacturing apparatus uses a dry paper recycling technology. The sheet manufacturing apparatus disclosed in JP-A-2012-144819 includes a material feeder that feeds waste paper, a defibrator that defibrates the waste paper, an accumulator that accumulates the defibrated substance generated by the defibrator on a mesh belt, and a forming unit that forms the accumulation generated by the accumulator into a certain shape. The accumulator accumulates the defibrated substance on the mesh belt and sucks the defibrated substance on the mesh belt from under the mesh belt to generate the accumulation. In the sucking, substances such as short fibers in powder form and foreign substances are sucked. The sucked powder is collected by a collection unit.

In the collection unit described in JP-A-2012-144819, the collected powder falls naturally to the storage and is stored in the storage. Thus, the density of the powder in the storage is low, resulting in low storage efficiency or low collection efficiency.

To solve the problem, the collection unit may have a transportation and compression mechanism described in JP-A-2009-61385. In JP-A-2009-61385, collected shredded pieces are sent by a screw to a shredded-waste bag and the shredded-waste bag is compressed, and thus the collection efficiency is improved.

However, if the fine powder described in JP-A-2012-144819 is transported and compressed by the structure described in JP-A-2009-61385, the powder sent by the screw would remain around the opening of the shredded-waste bag, and the powder is unlikely to evenly spread all over the shredded-waste bag. Furthermore, the compression mechanism makes the apparatus complex.

SUMMARY

A powder collection unit according to an aspect of the present disclosure includes a powder storage having an inlet through which powder including fibers enters and an outlet through which the powder exits, a delivery screw having an elongated shape, disposed in the powder storage, and configured to rotate about a rotation axis to send out and discharge the powder through the outlet, and a powder collection portion coupled to the outlet and having an inner space that collects the powder discharged through the outlet. An end portion of the delivery screw that is adjacent to the outlet protrudes outwardly from the powder storage through the outlet and resides in the inner space of the powder collection portion.

A fiber processing apparatus according to another aspect of the present disclosure includes a defibrator configured to defibrate a raw material containing fibers, an accumulator configured to disperse a defibrated substance generated by the defibrator in air and perform suction to accumulate the defibrated substance, and the powder collection unit according to the present disclosure configured to collect powder including the fibers sucked by the accumulator.

DESCRIPTION OF EXEMPLARY EMBODIMENTS

Figure 1:
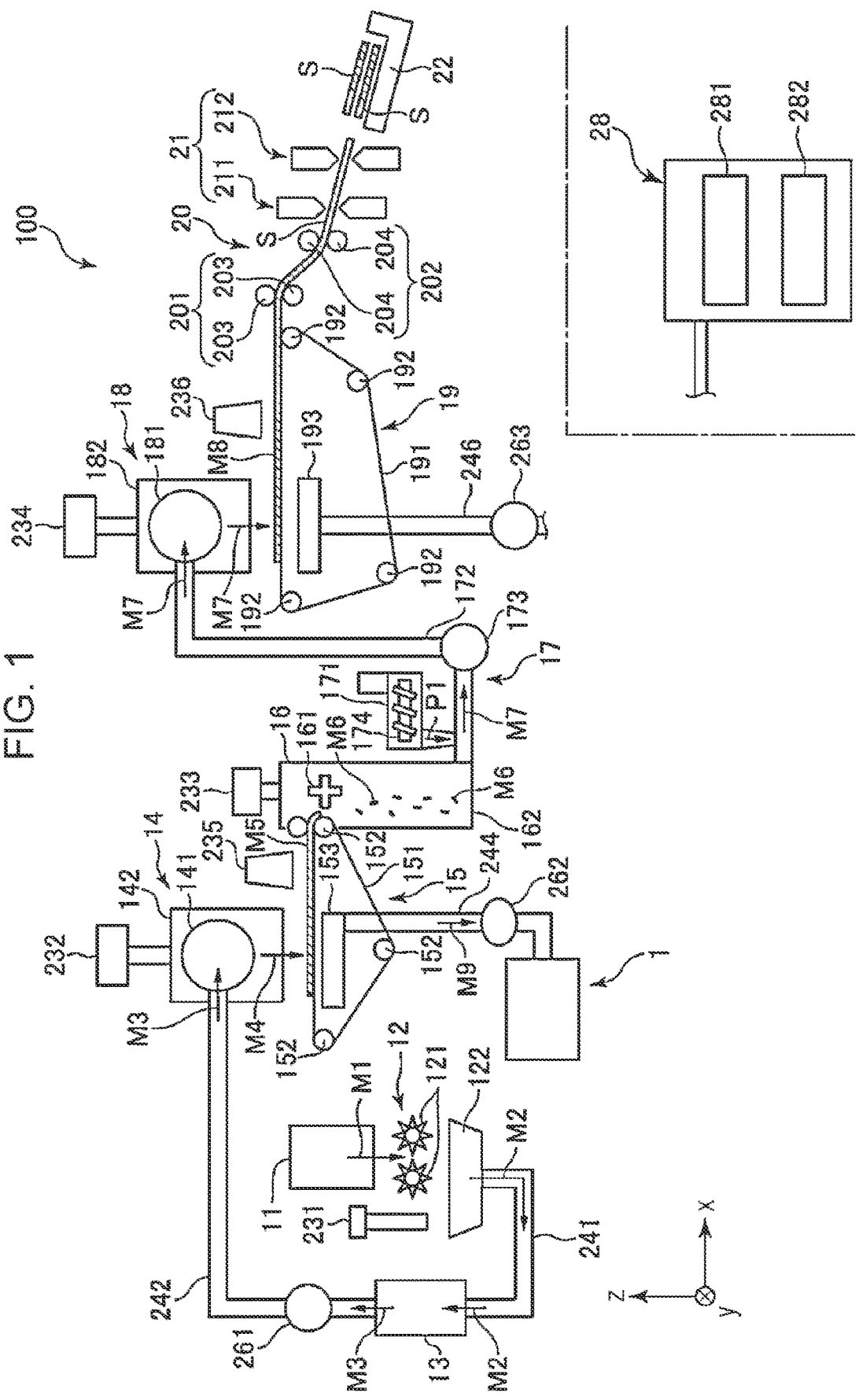
FIG. 1 is a schematic side view illustrating a sheet manufacturing apparatus including a powder collection unit according to a first embodiment of the present disclosure.

Hereinafter, a powder collection unit and a fiber processing apparatus according to the present disclosure will be described in detail by using embodiments illustrated in the drawings.

First Embodiment

Figure 2:
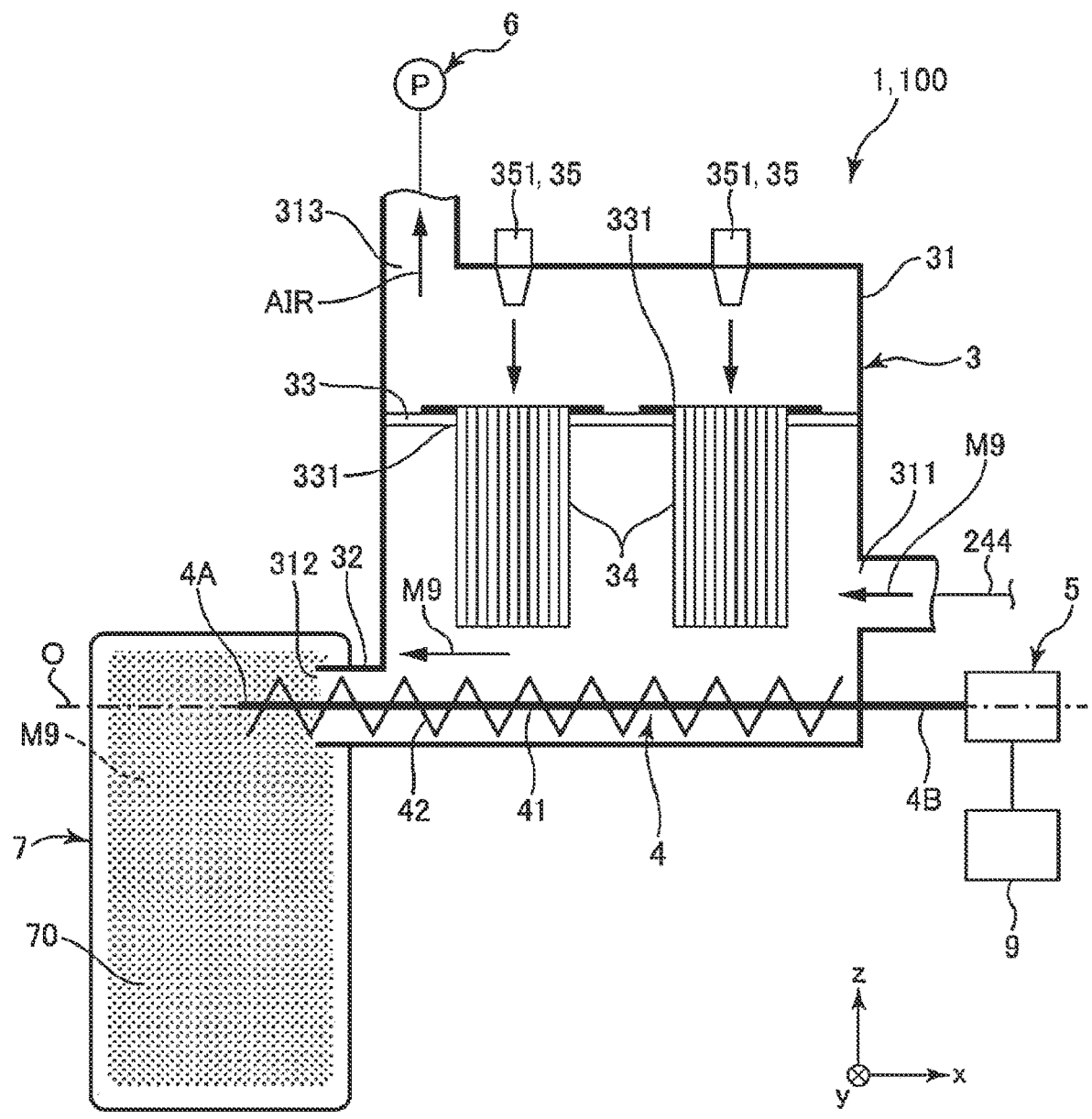
FIG. 2 is a cross-sectional view schematically illustrating the powder collection unit in FIG. 1.
Figure 3:
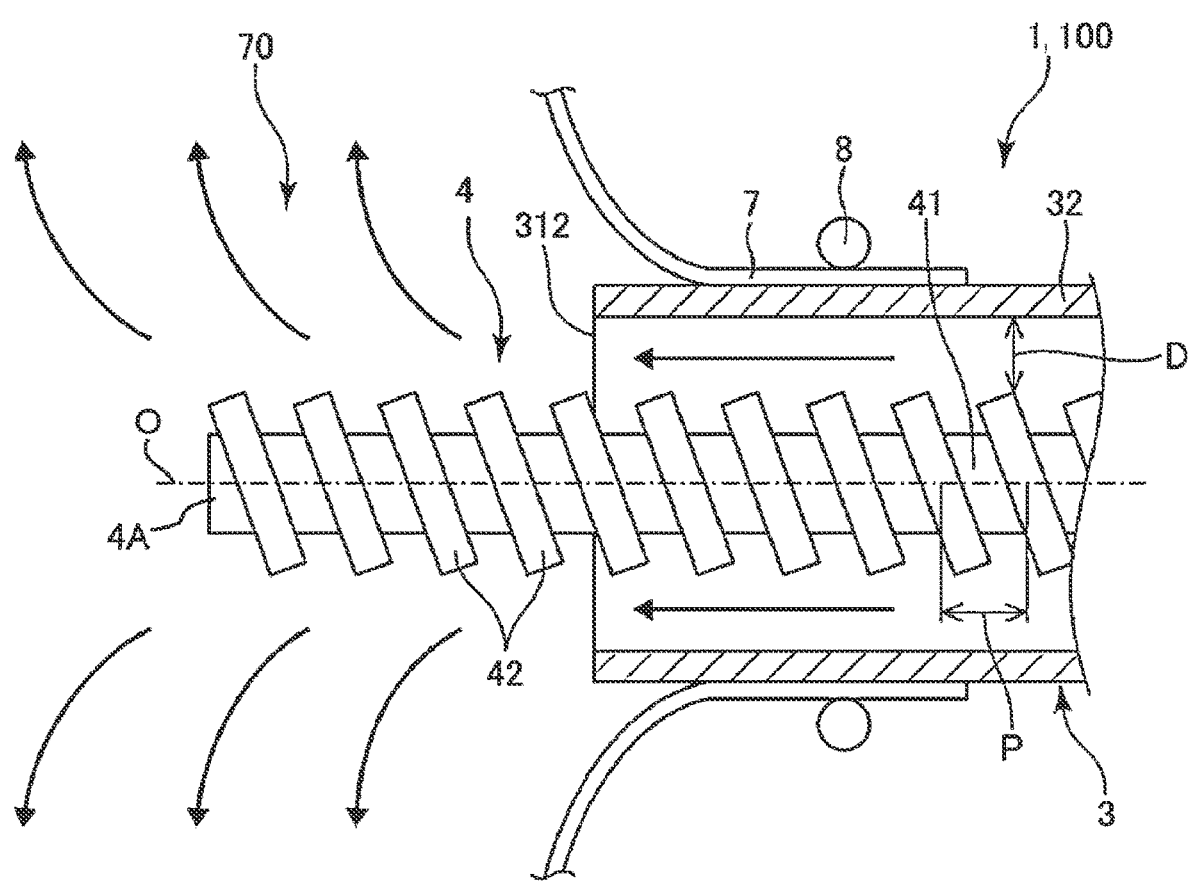
FIG. 3 is a cross-sectional view illustrating a leading end portion of a delivery screw in FIG. 2 and components around the leading end portion.
Figure 4:
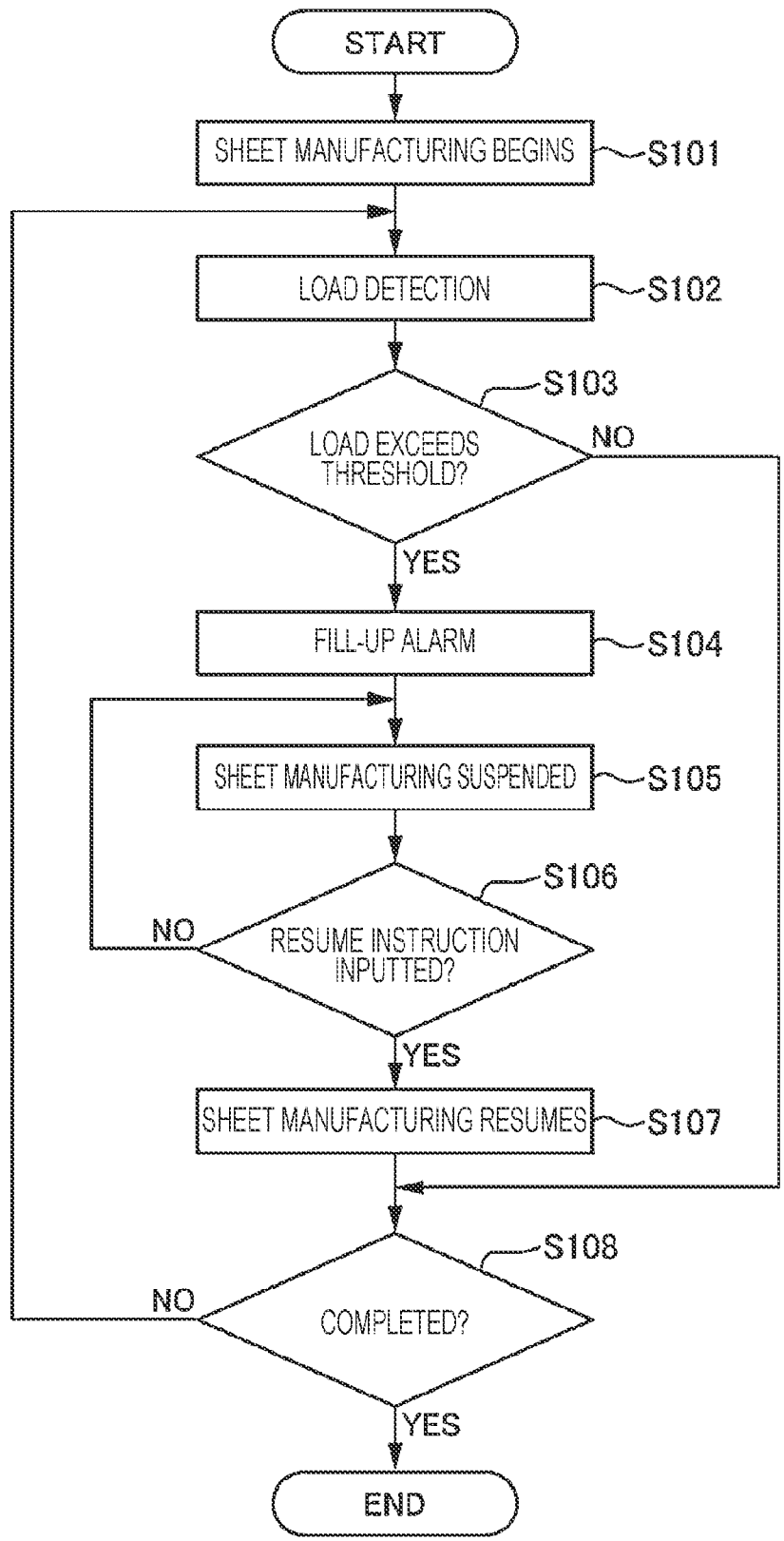
FIG. 4 is a flowchart representing an example of control executed by a controller in FIG. 1.

FIG. 1 is a schematic side view illustrating a sheet manufacturing apparatus including a powder collection unit according to a first embodiment of the present disclosure. FIG. 2 is a cross-sectional view schematically illustrating the powder collection unit illustrated in FIG. 1. FIG. 3 is a cross-sectional view illustrating a leading end portion of a delivery screw in FIG. 2 and components around the leading end portion. FIG. 4 is a flowchart representing an example of control executed by the controller in FIG. 1.

In the following description, as illustrated in FIGS. 1 and 2, three axes perpendicular to each other are defined as x, y, and z axes for illustrative purposes. An x-y plane parallel to the x and y axes extends horizontally. The z axis extends vertically. The directions pointed by the arrows of the axes are prefixed with "+" and the opposite directions are prefixed with "−". The upper side in FIG. 1 is referred to as "up" or "upward" and the lower side in FIG. 1 is referred to as "down" or "downward" in some cases.

As illustrated in FIG. 1, a fiber processing apparatus 100 is a recycling apparatus configured to recycle a raw material M1 into sheets S and includes a raw material feeder 11, a coarse crusher 12, a defibrator 13, a sorter 14, a first web forming unit 15, a comminutor 16, a mixer 17, an untangling unit 18, a second web forming unit 19, a sheet forming unit 20, a cutting unit 21, a holder 22, a powder collection unit 1 according to the present disclosure, and a controller 28. These components are electrically coupled to the controller 28 and the operations of the components are controlled by the controller 28. The controller 28 may be a component of the powder collection unit 1.

The fiber processing apparatus 100 includes humidifiers 231, 232, 233, 234, 235, and 236. In addition, the fiber processing apparatus 100 includes blowers 261, 262, and 263.

The fiber processing apparatus 100 performs, in this order, a material feeding step, a coarsely crushing step, a defibrating step, a sorting step, a first web forming step, a fractionizing step, a mixing step, an untangling step, a second web forming step, a sheet forming step, and a cutting step.

Hereinafter, the configurations of the components are described. The raw material feeder 11 performs the material feeding step of feeding the raw material M1 to the coarse crusher 12. The raw material M1 is a sheet-like material formed of a fiber-containing material containing a cellulose fiber. The cellulose fiber may be any fibrous material that contains mainly cellulose as a compound. The cellulose fiber may contain hemicellulose or lignin in addition to the cellulose. The raw material M1 may be in any form, such as a woven cloth and a non-woven cloth. The raw material M1 may be recycled paper produced by defibrating and recycling waste paper or may be a synthetic paper YUPO (registered trademark) or may be paper other than the recycled paper. In this embodiment, the raw material M1 is waste paper that has been used or unwanted.

The coarse crusher 12 performs the coarsely crushing step of coarsely crushing the raw material M1 fed by the raw material feeder 11 in air such as ambient air. The coarse crusher 12 includes two coarsely crushing blades 121 and a chute 122.

The two coarsely crushing blades 121 rotate in opposite directions to coarsely crush or cut the raw material M1 therebetween to generate coarsely crushed pieces M2. The coarsely crushed piece M2 may have a shape and a size suitable for the defibrating process at the defibrator 13. The coarsely crushed piece M2 may be a small piece having a length of not more than 100 mm or a small piece having a length of not less than 10 mm and not more than 70 mm.

The chute 122 is located below the coarsely crushing blades 121 and has a funnel-like shape, for example. Thus, the chute 122 can receive the falling coarsely crushed pieces M2 that were coarsely crushed by the coarsely crushing blades 121.

The humidifier 231 is disposed above the chute 122 and is adjacent to the two coarsely crushing blades 121. The humidifier 231 humidifies the coarsely crushed pieces M2 in the chute 122. The humidifier 231 is a vapor humidifier, which includes a moist filter through which air passes, and sends the humidified air having an increased humidity to the coarsely crushed pieces M2. The humidified air sent to the coarsely crushed pieces M2 reduces the possibility that the coarsely crushed pieces M2 will attach to the chute 122 or other components by static electricity.

The chute 122 is coupled to the defibrator 13 through a tube 241. The coarsely crushed pieces M2 in the chute 122 are transported through the tube 241 to the defibrator 13.

The defibrator 13 performs the defibrating step of dry-defibrating the coarsely crushed piece M2 in air. In the defibrating process of the defibrator 13, a defibrated substance M3 is generated from the coarsely crushed piece M2. Here, the term "defibrating" means separating the coarsely crushed piece M2, which is composed of multiple fibers bonded together, into individual fibers. The separated fibers compose the defibrated substance M3. The fibers of the defibrated substance M3 each have a linear shape or a band-like shape. The defibrated substance M3 may be tangled into a small mass or may have a "lump".

In this embodiment, the defibrator 13 includes, for example, a rotary blade that rotates at high speed and an impeller mill having a liner located outward from the rotary blade. The coarsely crushed piece M2 that has flowed into the defibrator 13 is defibrated while being sandwiched between the rotary blade and the liner.

The defibrator 13 creates a current of air or air stream flowing from the coarse crusher 12 toward the sorter 14 by rotation of the rotary blade. This enables the coarsely crushed piece M2 in the tube 241 to be sucked into the defibrator 13. Furthermore, this enables, after the defibration process, the defibrated substance M3 to be sent to the sorter 14 through a tube 242.

The blower 261 is disposed on the tube 242. The blower 261 is an air stream generator that generates air stream flowing toward the sorter 14. The blower 261 accelerates the transportation of the defibrated substance M3 toward the sorter 14.

The sorter 14 performs the sorting step of sorting the defibrated substance M3 according to the fiber length. The sorter 14 sorts the defibrated substance M3 into a sorted substance M4 and an unwanted substance larger than the sorted substance M4. The sorted substance M4 has a size suitable for the subsequent steps of manufacturing the sheets S. The average length of the sorted substance M4 is preferably not less than 1 μm and not more than 30 μm. The unwanted substance includes, for example, too short fibers unsuitable for sheet manufacturing and foreign substances such as colorants and dusts.

The sorter 14 includes a drum 141 and a housing 142 housing the drum 141.

The drum 141 is a sieve that has a meshed hollow cylindrical body and rotates about the central axis thereof. The defibrated substance M3 flows into the drum 141. Then, when the drum 141 is rotated, the defibrated substance M3 smaller than the sieve opening is sorted as the sorted substance M4 and the defibrated substance M3 larger than the sieve opening is sorted as the unwanted substance and is discarded through a conduit (not illustrated).

The sorted substance M4 falls from the drum 141 toward the first web forming unit 15 located below the drum 141 while being dispersed in the air. The first web forming unit 15 performs the first web forming step of forming a first web M5 from the sorted substance M4. The first web forming unit 15 includes a mesh belt 151, three tension rollers 152, and a suction portion 153.

The mesh belt 151 is an endless belt on which the sorted substance M4 accumulates. The mesh belt 151 is wound on the three tension rollers 152. When the tension rollers 152 are rotated, the sorted substance M4 on the mesh belt 151 is transported downstream.

The sorted substance M4 is larger than the mesh opening of the mesh belt 151. Thus, the sorted substance M4 does not pass through the mesh belt 151 and accumulates on the mesh belt 151. The sorted substance M4 accumulating on the mesh belt 151 is transported downstream together with the mesh belt 151 and thus a layered first web M5 is formed.

In some cases, the sorted substance M4 contains short fibers, grit, and dust, for example. In such cases, they are sucked by the suction portion 153 and collected by the powder collection unit 1 according to the present disclosure.

The suction portion 153 is a suction system for sucking air from under the mesh belt 151. Thus, grit and dust that have passed through the mesh belt 151 are sucked together with air.

The suction portion 153 is coupled to the powder collection unit 1 through a tube 244. The short fibers, grit, and dust sucked by the suction portion 153 are collected by the powder collection unit 1. Hereinafter, the short fibers and foreign substances such as colorants that are sucked by the suction portion 153 will be collectively referred to as "powder M9." The fibers in the powder M9 have an average length of about 5 μm or smaller.

A blower 262 is disposed on the tube 244. When the blower 262 is operated, a suction force is generated at the suction portion 153. This accelerates formation of the first web M5 on the mesh belt 151. The first web M5 formed in this way does not contain grit and dust. When the blower 262 is operated, the powder M9 passes through the tube 244 to the powder collection unit 1. The structure of the powder collection unit 1 will be described later in detail.

The housing 142 is coupled to the humidifier 232. The humidifier 232 is a vapor humidifier as the humidifier 231. Thus, the humidified air is supplied into the housing 142. The humidified air humidifies the sorted substance M4, reducing the possibility that the sorted substance M4 will be attached to the inner wall of the housing 142 by an electrostatic force.

The humidifier 235 is disposed downstream of the sorter 14. The humidifier 235 is an ultrasonic humidifier that sprays water. The moisture is supplied by the humidifier 235 to the first web M5, and thus the moisture content of the first web M5 is controlled. This control reduces the possibility that the first web M5 will be attracted by an electrostatic force to the mesh belt 151. Thus, the first web M5 is readily detached from the mesh belt 151 at a position where the mesh belt 151 is turned by the tension roller 152.

The sorter 14 and the first web forming unit 15 constitute an accumulator that disperses the defibrated substance M3 generated by the defibrator 13 and performs suction to accumulate the defibrated substance M3.

The comminutor 16 is disposed downstream of the humidifier 235. The comminutor 16 performs the fractionizing step of fractionizing the first web M5 detached from the mesh belt 151. The comminutor 16 includes a rotatably supported propeller 161 and a housing 162 housing the propeller 161. The rotating propeller 161 fractionizes the first web M5. The first web M5 is fractionized into fractionized pieces M6. The fractionized pieces M6 fall in the housing 162.

The housing 162 is coupled to the humidifier 233. The humidifier 233 is a vapor humidifier as the humidifier 231. Thus, humidified air is supplied into the housing 162. The humidified air reduces the possibility that the fractionized pieces M6 will be attached to the propeller 161 and the inner wall of the housing 162 by an electrostatic force.

The mixer 17 is disposed downstream of the comminutor 16. The mixer 17 performs the mixing step of mixing the fractionized pieces M6 and an adhesive P1. The mixer 17 includes an adhesive feeder 171, a tube 172, and a blower 173.

The tube 172 couples the housing 162 of the comminutor 16 to a housing 182 of the untangling unit 18. The tube 172 is a passage through which a mixture M7 of the fractionized pieces M6 and the adhesive P1 passes.

The adhesive feeder 171 is coupled midway between the ends of the tube 172. The adhesive feeder 171 includes a screw feeder 174. When the screw feeder 174 is rotated, the adhesive P1 in powder form or particle form is fed to the tube 172. The adhesive P1 fed to the tube 172 is mixed with the fractionized pieces M6 to be a mixture M7.

The adhesive P1 is a bonding material that bonds the fibers in the subsequent step. Examples of the adhesive P1 include a thermoplastic resin, a curable resin, starch, dextrin, glycogen, amylose, hyaluronic acid, arrowroot, konjac starch, potato starch, etherified starch, esterified starch, natural gums such as etherified tamarind gum, etherified locust bean gum, etherified guar gum, and acacia Arabic gum, fiber derivative glue such as etherified carboxymethyl cellulose and hydroxyethyl cellulose, seaweeds such as sodium alginate and agar, and animal proteins such as collagen, gelatin, and hydrolyzed collagen, and sericin. Preferably, the adhesive P1 is a thermoplastic resin. Examples of the thermoplastic resin include polyolefins such as AS resin, ABS resin, polyethylene, polypropylene, and ethylene-vinyl acetate (EVA) copolymer, acrylic resins such as modified polyolefin and polymethyl methacrylate, polyesters such as polyvinyl chloride, polystyrene, polyethylene terephthalate, and polybutylene terephthalate, polyamides (nylons) such as nylon 6, nylon 46, nylon 66, nylon 610, nylon 612, nylon 11, nylon 12, nylon 6-12, and nylon 6-66, liquid crystal polymers such as polyphenylene ether, polyacetal, polyether, polyphenylene oxide, polyether ether ketone, polycarbonate, polyphenylene sulfide, thermoplastic polyimide, polyether imide, and aromatic polyester, various thermoplastic elastomers such as a styrene-based elastomer, a polyolefin-based elastomer, a polyvinyl chloride-based elastomer, a polyurethane-based elastomer, a polyester-based elastomer, a polyamide-based elastomer, a polybutadiene-based elastomer, a trans polyisoprene-based elastomer, a fluoro-rubber-based elastomer, and a chlorinated polyethylene-based elastomer. They may be used alone or in combination. Preferably, the thermoplastic resin is a polyester or contains a polyester.

The adhesive feeder 171 may feed, in addition to the adhesive P1, an additive such as a colorant for coloring fibers, a coagulation inhibitor for preventing coagulation of fibers or coagulation of the adhesive P1, a flame retardant for making the fibers resistant to fire, and a paper strength enhancer for enhancing the strength of the sheets S. Alternatively, the adhesive feeder 171 may feed a composite containing at least one of the above additives and the adhesive P1.

On the tube 172, the blower 173 is disposed downstream of the adhesive feeder 171. The fractionized pieces M6 and the adhesive P1 are mixed through the action of a rotary portion of the blower 173 such as a blade. Furthermore, the blower 173 generates an air stream flowing toward the untangling unit 18. The air stream stirs the fractionized pieces M6 and the adhesive P1 in the tube 172. Thus, the mixture M7 flows into the untangling unit 18 with the fractionized pieces M6 and the adhesive P1 being evenly dispersed. The fractionized pieces M6 in the mixture M7 are untangled when passing through the tube 172 and become finer fibrous pieces.

The untangling unit 18 performs the untangling step of untangling the tangled fibers in the mixture M7. The untangling unit 18 includes a drum 181 and a housing 182 housing the drum 181.

The drum 181 is a sieve that has a meshed hollow cylindrical body and rotates about the central axis thereof. The mixture M7 flows into the drum 181. Then, when the drum 181 is rotated, elements such as fibers in the mixture M7 smaller than the sieve opening pass through the drum 181. The mixture M7 is untangled when passing through the drum 181.

The housing 182 is coupled to the humidifier 234. The humidifier 234 is a vapor humidifier as the humidifier 231. Thus, the humidified air is supplied into the housing 182. The humidified air humidifies the housing 182, reducing the possibility that the mixture M7 will be attached to the inner wall of the housing 182 by an electrostatic force.

The mixture M7 untangled in the drum 181 falls toward the second web forming unit 19 located below the drum 181 while being dispersed in the air. The second web forming unit 19 performs the second web forming step of forming a second web M8 from the mixture M7. The second web forming unit 19 includes a mesh belt 191, tension rollers 192, and a suction portion 193.

The mesh belt 191 is an endless belt on which the mixture M7 accumulates. The mesh belt 191 is wound on the four tension rollers 192. When the tension rollers 192 are rotated, the mixture M7 on the mesh belt 191 is transported downstream.

Almost all the mixture M7 on the mesh belt 191 is larger than the mesh opening of the mesh belt 191. Thus, the mixture M7 does not pass through the mesh belt 191 and accumulates on the mesh belt 191. The mixture M7 accumulating on the mesh belt 191 is transported downstream together with the mesh belt 191, and thus the mixture forms a layered second web M8.

The suction portion 193 is a suction system for sucking air from under the mesh belt 191. Thus, the mixture M7 is sucked onto the mesh belt 191, accelerating accumulation of the mixture M7 on the mesh belt 191.

A tube 246 is coupled to the suction portion 193. Furthermore, the blower 263 is disposed on the tube 246. When the blower 263 is operated, a suction force is generated at the suction portion 193.

The humidifier 236 is disposed downstream of the untangling unit 18. The humidifier 236 is an ultrasonic humidifier as the humidifier 235. The moisture is supplied by the humidifier 236 to the second web M8, and thus the moisture content of the second web M8 is controlled. The control reduces the possibility that the second web M8 will be attracted by an electrostatic force to the mesh belt 191. Thus, the second web M8 is readily detached from the mesh belt 191 at a position where the mesh belt 191 is turned by the tension roller 192.

The total amount of moisture added by the humidifiers 231 to 236 is preferably not less than 0.5 parts by mass and not more than 20 parts by mass per 100 parts by mass of the material before humidification, for example.

The sheet forming unit 20 is disposed downstream of the second web forming unit 19. The sheet forming unit 20 performs the sheet forming step of forming the sheet S from the second web M8. The sheet forming unit 20 includes a pressure portion 201 and a heating portion 202.

The pressure portion 201 includes two calendar rollers 203. The second web M8 is pressurized between the calendar rollers 203 without being heated. This increases the density of the second web M8. The second web M8 may be heated to the extent that the adhesive P1 does not melt, for example. Then, the second web M8 is transported toward the heating portion 202. One of the two calendar rollers 203 is a driving roller that is powered by a motor (not illustrated) and the other is a driven roller.

The heating portion 202 includes two heating rollers 204. The second web M8 is pressurized and heated between the heating rollers 204. The pressure and the heat melt the adhesive P1 in the second web M8, and the melted adhesive P1 bonds the fibers to each other. In this way, the sheet S is formed. The sheet S is then transported toward the cutting unit 21. One of the two heating rollers 204 is a driving roller that is powered by a motor (not illustrated) and the other is a driven roller.

The cutting unit 21 is disposed downstream of the sheet forming unit 20. The cutting unit 21 performs the cutting step of cutting the sheet S. The cutting unit 21 includes a first cutter 211 and a second cutter 212.

The first cutter 211 cuts the sheet S in a direction intersecting the transportation direction of the sheet S, particularly in a direction perpendicular to the transportation direction of the sheet S.

The second cutter 212 is disposed downstream of the first cutter 211 and cuts the sheet S in a direction parallel to the transportation direction of the sheet S. In the cutting, the both ends of the sheet S or unnecessary portions at the ends in the +y axis direction and the −y axis direction are removed to make the width of the sheet S uniform. The portion cut off and removed is called a "scrap".

The sheet S having a desired shape and size is obtained by the cutting using the first and second cutters 211 and 212. The sheet S is transported further downstream and then stacked on the holder 22.

The components of the fiber processing apparatus 100 are electrically coupled to the controller 28. The components are controlled by the controller 28.

The controller 28 includes a central processing unit (CPU) 281 and memory 282. The CPU 281 is configured to make various decisions and execute various instructions, for example.

The memory 282 stores various programs including a program for producing the sheets S, calibration curves, and tables, for example.

The controller 28 may be installed in the fiber processing apparatus 100 or mounted in an external device such as an external computer. The external device may be communicated with the fiber processing apparatus 100 by cable or by radio or may be accessible by a network such as internet through the fiber processing apparatus 100.

The CPU 281 and the memory 282 may be an integral one unit. Alternatively, the CPU 281 may be installed in the fiber processing apparatus 100 and the memory 282 may be mounted in an external device such as an external computer. Alternatively, the memory 282 may be installed in the fiber processing apparatus 100 and the CPU 281 may be mounted in an external device such as an external computer.

Next, the powder collection unit 1 will be described. As illustrated in FIG. 2, the powder collection unit 1 is configured to collect the powder M9 sucked by the suction portion 153 illustrated in FIG. 1. The powder collection unit 1 includes a powder storage 3, a delivery screw 4, a driver 5 for driving the delivery screw 4, a negative pressure forming portion 6, a powder collection portion 7, and a detector 9.

As illustrated in FIG. 2, the powder storage 3 includes a storage tank 31 configured to receive the powder M9 through the tube 244, temporarily store the powder M9, and discharge the powder M9 to the powder collection portion 7, and a protrusion 32 having a tubular shape and protruding outwardly from the storage tank 31. The storage tank 31 has an inlet 311 through which the powder M9 enters, an outlet 312 through which the powder M9 exits, and a vent 313.

The inlet 311 is coupled to the tube 244. In FIG. 2, the storage tank 31 has the inlet 311 at a position near the −z and +x direction end. However, the position of the inlet 311 is not limited to that in FIG. 2.

The protrusion 32 has a tubular shape and the opening of the protrusion 32 is the outlet 312. The protrusion 32 is coupled to the powder collection portion 7. Specifically described, the powder collection portion 7 is airtightly fixed to the outer surface of the protrusion 32. The storage tank 31 has the outlet 312 at a position near the −z and −x direction end. However, the position of the outlet 312 is not limited to that in FIG. 2.

As described above, the powder storage 3 includes the storage tank 31 and the protrusion 32 having a tubular shape and protruding outwardly from the storage tank 31. The outlet 312 is the opening of the protrusion 32. This configuration allows the powder collection portion 7 to be fixed to the outer surface of the protrusion 32, and thus the powder collection portion 7 is readily attachable to and detachable from the powder storage 3. Furthermore, this configuration allows the powder M9 discharged through the outlet 312 to readily spread all over the powder collection portion 7.

The vent 313 is coupled to the negative pressure forming portion 6. The air in the storage tank 31 is discharged through the vent 313. The storage tank 31 has the vent 313 at a position near the +z and −x direction end. The position of the outlet 312 is not limited to that in FIG. 2.

The amount of air discharged through the vent 313 is larger than the amount of air flowing in through the inlet 311 together with the powder M9 per unit time. This allows the inside of the storage tank 31 to be kept at a negative pressure. The negative pressure forming portion 6 may include a pump and the controller 28 may be electrically coupled to the negative pressure forming portion 6 to control the operation.

The powder storage 3 includes a partition plate 33 and filters 34. The partition plate 33 separates the space in the storage tank 31 into a space including the inlet 311 and a space including the vent 313. The partition plate 33 has two through holes 331. The filters 34 are disposed in the respective through holes 331.

The filter 34 may be formed of a woven fabric or a non-woven fabric. The filter 34 has openings that allow passage of air but does not allow the passage of the powder M9 to catch the powder M9. This prevents the powder M9 from flowing out through the vent 313.

As described above, the powder storage 3 has the vent 313 through which the air inside the powder storage 3 is discharged, the negative pressure forming portion 6, which is the suction portion coupled to the vent 313 and configured to suck air, and the filters 34 configured to catch the powder M9 flowing toward the vent 313. This makes the pressure inside the powder storage 3 negative, and thus supply of air to the powder collection portion 7, which will be described later, is prevented or reduced. Furthermore, this prevents the powder M9 from flowing out through the vent 313.

The powder storage 3 further includes removers 35 that remove the powder M9 caught in the filter 34 from the filter 34. This prevents clogging of the filter 34 and allows the powder M9 in the powder storage 3 to effectively flow out through the outlet 312.

In this embodiment, the removers 35 include ejectors 351 that eject air. The ejectors 351 are opposed to the respective filters 34. Specifically described, the ejectors 351 are adjacent to the filters 34 in the +z direction and are configured to eject air in the −z direction. The ejectors 351 may be blowers and the controller 28 controls the operation of the ejectors 351.

The ejectors 351 may eject air intermittently or continuously. The amount of air ejected by the ejectors 351 should be controlled such that the powder storage 3 keeps the negative pressure.

Next, the delivery screw 4 will be described. As illustrated in FIG. 2, the delivery screw 4 rotates about the rotation axis O to send the powder M9 toward the outlet 312 to discharge the powder M9. The delivery screw 4 is positioned in the x axis direction and located adjacent to the −z direction end of the storage tank 31. The delivery screw 4 has a leading end portion 4A and a base end portion 4B. The leading end portion 4A is the left end portion in FIG. 2. The base end portion 4B is the right end portion in FIG. 2.

The base end portion 4B is coupled to the driver 5. The driver 5 is electrically coupled to the controller 28 illustrated in FIG. 1. The controller 28 controls the condition for energization of the driver 5 to control the operation of the driver 5. The driver 5 outputs a rotational force when energized and the rotational force is transmitted to the base end portion 4B. This rotates the delivery screw 4, and thus the powder M9 is sent out and discharged.

The detector 9 detects the load on the driver 5 and may be a torque sensor. The detector 9 is electrically coupled to the controller 28. The detection result of the detector 9 is sent to the controller 28 and is used in the control described below.

In FIG. 2, the base end portion 4B is positioned outside the storage tank 31 or protrudes from the storage tank 31 in the +x axis direction. However, the configuration of the base end portion 4B is not limited to this and the base end portion 4B may be positioned in the storage tank 31. In such a case, the driver 5 may be positioned in the storage tank 31 or may be positioned outside the storage tank 31.

As illustrated in FIG. 3, the delivery screw 4 includes a screw shaft 41 and a thread 42 on the outer surface of the screw shaft 41. The thread 42 is a helical rib on the outer surface of the screw shaft 41.

The powder M9 sent by the delivery screw 4 is discharged through the outlet 312 to the powder collection portion 7.

As illustrated in FIG. 2, the powder collection portion 7 has an inner space 70 to collect and store the powder M9 discharged through the outlet 312. The powder collection portion 7 is detachable from the protrusion 32. When the amount of the powder M9 in the inner space 70 reaches a predetermined value or when the inner space 70 is filled with the powder M9, the powder collection portion 7 is detached from the protrusion 32. Then, the powder M9 in the inner space 70 is discarded and then the emptied powder collection portion 7 is attached to the protrusion 32. Alternatively, the powder collection portion 7 is discarded together with the powder M9 and a new powder collection portion 7 is attached to the protrusion 32.

The powder collection portion 7 is a flexible bag. This enables, when only a small amount of the powder M9 is contained in the inner space 70, the volume of the powder collection portion 7 to be kept small. This enables easy visual confirmation of the amount of the powder M9 in the powder collection portion 7.

The powder collection portion 7 is formed of an airtight material. This prevents air outside the powder collection portion 7 from flowing into the inner space 70 due to the negative pressure in the storage tank 31. Thus, the inner space 70 is kept at a negative pressure, preventing or reducing entry of air into the inner space 70 through the outlet 312. This enables efficient storage of the powder M9 in the inner space 70.

Examples of the material of the powder collection portion 7 include, but are not limited to, polyolefins such as polyethylene, polypropylene, polybutadiene, and ethylene-vinyl acetate (EVA) copolymer, polyesters such as polyethylene terephthalate (PET) and polybutylene terephthalate (PBT), various heat fusible elastomers such as soft polyvinyl chloride, polyvinylidene chloride, silicone, polyurethane, and polyamide elastomer, and any combination thereof (a resin blend and a polymer alloy).

The inside of the powder collection portion 7 may be either visible or invisible but is preferably visible. This enables easy visual confirmation of the amount of the powder M9 in the powder collection portion 7.

As described above, the powder collection portion 7 is coupled to the outer surface of the protrusion 32. This enables the powder M9 discharged through the outlet 312 to readily spread all over the powder collection portion 7.

As illustrated in FIG. 3, the powder collection portion 7 is fixed to the protrusion 32 by a fixing member 8. Examples of the fixing member 8 include, but are not limited to, a string in FIG. 3 and an adhesive tape.

In the powder collection unit 1, as illustrated in FIGS. 2 and 3, the end portion of the delivery screw 4 that is adjacent to the outlet 312, or the leading end portion 4A, protrudes outwardly from the powder storage 3 through the outlet 312 and resides in the inner space 70. In other words, the delivery screw 4 extends to the inner space 70 of the powder collection portion 7. With this configuration, the delivery screw 4 can send the powder M9 to a position in the inner space 70 farther from the outlet 312.

Furthermore, in the inner space 70, the powder M9 discharged through the outlet 312 is spread by the leading end portion 4A of the delivery screw 4 in a direction indicated by the arrow in FIG. 3 or in the radial direction of the delivery screw 4. The powder M9 spreads over the inner space 70 without staying around the outlet 312, allowing the powder collection portion 7 to hold the powder M9 at the full or almost full capacity. In other words, the powder collection portion 7 can hold a larger amount of the powder M9. This configuration is advantageous when the powder collection portion 7 is a bag that expands as more powder M9 comes in.

The length of the portion of the delivery screw 4 protruding from the outlet 312 is preferably not less than 10 mm and not more than 200 mm, more preferably not less than 20 mm and not more than 100 mm, although the preferable length changes depending on the size and the material of the powder collection portion 7. The length in this range more reliably provides the above-described advantages.

The length of the portion of the delivery screw 4 protruding from the outlet 312 is preferably not less than 1% and not more than 50%, more preferably not less than 2% and not more than 30%, of the entire length of the delivery screw 4. The length in this range more reliably provides the above-described advantages.

The length of the portion of the delivery screw 4 protruding from the outlet 312 is preferably equal to or more than and 10 times or less the outer diameter of the delivery screw 4, more preferably not less than two times and not more than six times the outer diameter of the delivery screw 4. The length in this range more reliably provides the above-described advantages.

As illustrated in FIG. 3, the delivery screw 4 has the outer diameter smaller than the inner diameter of the protrusion 32 and the rotating delivery screw 4 is away from the rotating inner surface of the protrusion 32. The distance D between the inner surface of the protrusion 32 and the delivery screw 4 is preferably not less than 5 mm and not more than 10 mm, more preferably not less than 6 mm and not more than 9 mm. The distance D in this range ensures the sufficient amount of the powder M9 to be transported and ensures more reliable transportation of the powder M9.

Furthermore, as illustrated in FIG. 3, the delivery screw 4 has a helical thread 42. The pitch P of the thread 42 in the direction along the rotation axis O is preferably not less than 15 mm and not more than 30 mm, more preferably not less than 17 mm and not more than 27 mm. The pitch in this range ensures the sufficient amount of the powder M9 to be transported and ensures more reliable transportation of the powder M9.

Furthermore, the delivery screw 4 is positioned with the rotation axis O being tilted with respect to the vertical direction. The configuration in which the powder M9 is sent out in a direction other than the vertical direction more reliably provides the advantages of the present disclosure.

As described above, the powder collection unit 1 includes the powder storage 3 having the inlet 311 through which the powder M9 including fibers enters and the outlet 312 through which the powder M9 exits, the delivery screw 4 having an elongated shape, disposed in the powder storage 3, and configured to rotate about the rotation axis O to send out and discharge the powder M9 through the outlet 312, and the powder collection portion 7 coupled to the outlet 312 and having the inner space 70 that collects the powder M9 discharged through the outlet 312. The leading end portion 4A or the end portion of delivery screw 4 that is adjacent to the outlet 312 protrudes outwardly from the powder storage 3 through the outlet 312 and resides in the inner space 70 of the powder collection portion 7. This configuration enables the delivery screw 4 to send the powder M9 to a position in the inner space 70 farther from the outlet 312. Furthermore, in the inner space 70, the powder M9 discharged through the outlet 312 is spread by the leading end portion 4A of the delivery screw 4 in a direction indicated by the arrow in FIG. 3 or in the radial direction of the delivery screw 4. The powder M9 spreads over the inner space 70 without staying around the outlet 312, allowing the powder collection portion 7 to hold the powder M9 at the full or almost full capacity. In other words, the powder collection portion 7 can hold a larger amount of the powder M9. Furthermore, this simple configuration in which the leading end portion 4A protrudes outwardly from the powder storage 3 through the outlet 312 increases the amount of powder M9 held in the powder collection portion 7.

Furthermore, the fiber processing apparatus 100 includes the defibrator 13 configured to defibrate a raw material containing fibers in form of the coarsely crushed pieces M2, the sorter 14 and the first web forming unit 15 that function as the accumulator configured to disperse the defibrated substance M3 generated by the defibrator 13 in air and perform suction to accumulate the defibrated substance M3, and the powder collection unit 1 configured to collect the powder M9 including fibers sucked by the sorter 14 and the first web forming unit 15. The fiber processing apparatus 100 having such a configuration has the above-described advantages of the powder collection unit 1.

In the above explanation, the sorter 14 and the first web forming unit 15 function as the accumulator. However, the present disclosure is not limited to this. The untangling unit 18 and the second web forming unit 19 may function as the accumulator. Short fibers generated during suction by the suction portion 193 of the second web forming unit 19 may be the powder M9, and the tube 246 may be coupled to the powder collection unit 1.

Next, an example of control by the controller 28 will be explained with reference to the flowchart in FIG. 4.

The sheet manufacturing begins at the step S101. At the step S102, the detector 9 is activated to determine the load applied to the driver 5. The torque on the motor (not illustrated) of the driver 5 or the torque variation is detected in real time to determine the load.

Then, at the step S103, it is determined whether the load determined at the step S102 exceeds the threshold. The threshold is a value stored in the memory 282 and may be suitably set before the sheet manufacturing.

When the delivery screw 4 is sending out the powder M9, the powder collection portion 7 may already have been filled with the powder M9 up to the level of the leading end portion 4A. In such a case, the powder M9 in the powder collection portion 7 increases the resistance to the rotation of the delivery screw 4, increasing the load on the driver 5. In view of this, an experimental test is conducted in advance to determine how much the load increases and the result is stored as a threshold.

When it is determined at the step S103 that the load exceeds the threshold, the process proceeds to the step S104. When it is determined that at the step S103 that the load does not exceed the threshold, the process proceeds to the step S108.

At the step S104, an alarm is given that the powder collection portion 7 is filled with the powder M9 up to the level of the leading end portion 4A or the powder collection portion 7 is full. The alarm may be displayed on a monitor (not illustrated) or may be sounded.

Then, at the step S105, the sheet manufacturing is suspended. In other words, the components of the fiber processing apparatus 100 are brought to a halt.

Then, at the step S106, it is determined whether a resume instruction is inputted. This is determined based on whether the resume instruction is inputted through an input portion (not illustrated). Before inputting the resume instruction, the user replaces the powder collection portion 7 with new one or removes the powder M9 to empty the powder collection portion 7.

Then, when it is determined that the resume instruction is inputted at the step S106, the sheet manufacturing resumes at the step S107. In other words, the components of the fiber processing apparatus 100 are activated again.

Then, at the step S108, it is determined whether the sheet manufacturing is completed. This is determined based on whether the number of the manufactured sheets S reaches a predetermined value, for example.

When it is determined at the step S108 that the sheet manufacturing is completed, the execution of the program is terminated. Contrary to this, when it is determined at the step S108 that the sheet manufacturing is not completed, the process returns to the step S102 and the subsequent steps are repeated in the above-described order.

As described above, the powder collection unit 1 includes the driver 5 configured to rotate the delivery screw 4 and the detector 9 configured to determine a load on the driver 5. In this configuration, the powder collection portion 7 does not need to have a sensor for determining the amount of the powder M9 in the powder collection portion 7, and this simple configuration enables the user to know whether the amount of the powder M9 in the powder collection portion 7 exceeds the threshold.

Second Embodiment

Figure 5:
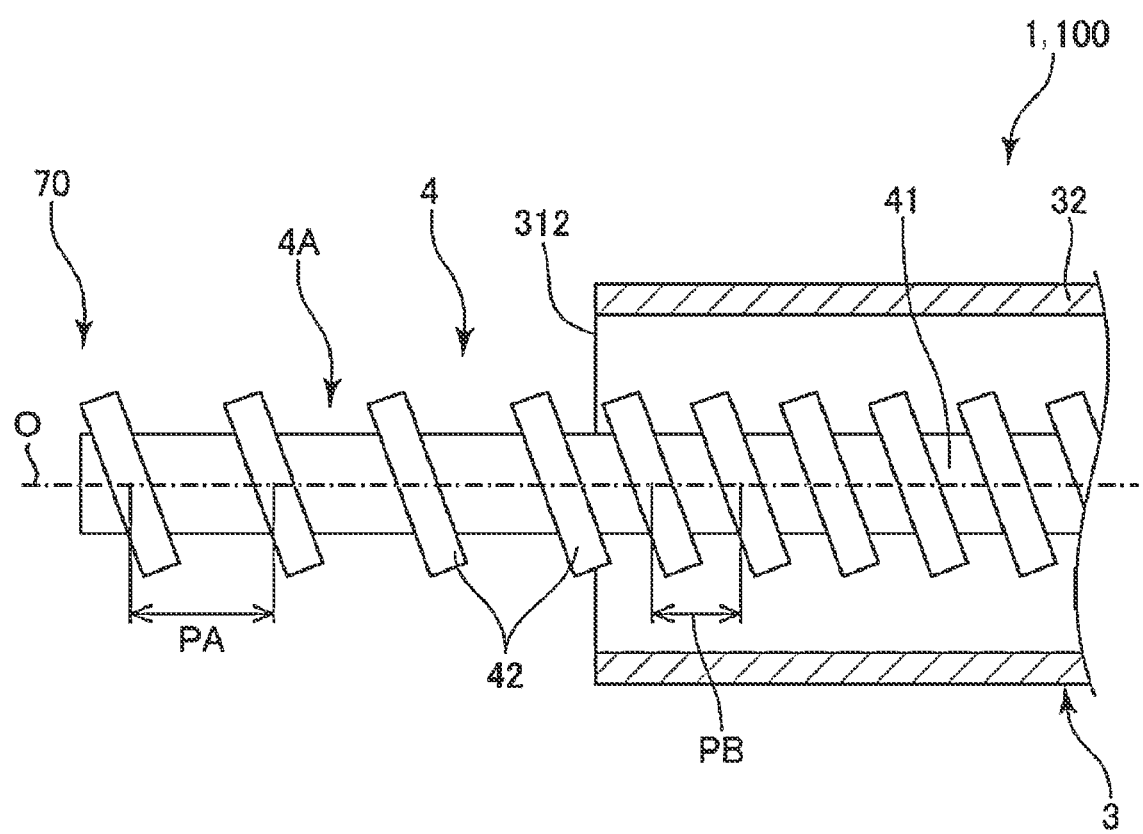
FIG. 5 is a cross-sectional view illustrating a leading end portion of a delivery screw included in a powder collection unit according to a second embodiment of the present disclosure and components around the leading end portion.

FIG. 5 is a cross-sectional view illustrating a leading end portion and a portion around the leading end portion of a delivery screw of a powder collection unit according to a second embodiment of the present disclosure.

Hereinafter, the powder collection unit according to the second embodiment of the present disclosure will be described with reference to the drawings. Differences between the above-described embodiment and the second embodiment will be mainly described, and the common features will not be discussed.

The present embodiment has the same configuration as the first embodiment except for the structure of the delivery screw.

In this embodiment, the thread 42 of the delivery screw 4 satisfies different conditions A and B. The thread 42 on the leading end portion 4A or a portion of the delivery screw 4 protruding from the outlet 312 satisfies the condition A and the thread 42 on the portion of the thread 42 that is located away from the outlet 312 toward the base end or located in the protrusion 32 satisfies the condition B.

Specifically described, as illustrated in FIG. 5, in this embodiment, the thread 42 of the portion of the delivery screw 4 protruding from the outlet 312 has a pitch PA and the thread 42 of the portion of the delivery screw 4 located in the protrusion 32 has a pitch PB. The pitch PB is smaller than the pitch PA. This slows down the transportation speed of the powder M9 discharged through the outlet 312, allowing the powder M9 to readily spread in the radial direction of the delivery screw 4. This more markedly provides the advantages of the present disclosure described in the first embodiment.

In an example of this embodiment, the condition A and the condition B differ from each other in that the pitch PB is smaller than the pitch PA. However, the present disclosure is not limited to this. The pitch PB may be larger than the pitch PA or the thread 42 may have a varied height or a varied stiffness.

When the thread 42 has a varied height, a portion of the delivery screw 4 protruding from the outlet 312 preferably has a higher thread 42. This allows the powder M9 to readily spread in the radial direction of the delivery screw 4. This more markedly provides the advantages of the present disclosure described in the first embodiment.

When the thread 42 has a varied stiffness, a portion of the delivery screw 4 protruding from the outlet 312 may have a thread 42 formed of a flexible material. The flexible thread 42 less damages the powder collection portion 7 when comes in contact with the powder collection portion 7.

The powder collection unit and the fiber processing apparatus according to the present disclosure has been described above using the embodiments illustrated in the drawings. However, the present disclosure is not limited to the above description. The components of the powder collection unit and the fiber processing apparatus may be replaced with any component that achieves the similar function to the corresponding component. Furthermore, the powder collection unit and the fiber processing apparatus may include any additional component.

The powder collection unit and the fiber processing apparatus according to the present disclosure may have a combination of any two or more configurations and characteristics described in the above-described embodiments.

What is claimed is:

1. A powder collection unit, comprising:
a powder storage having an inlet through which powder including fibers enters and an outlet through which the powder exits;
a delivery screw having an elongated shape, disposed in the powder storage, and configured to rotate about a rotation axis to send out and discharge the powder through the outlet; and
a powder collection portion coupled to the outlet and having an inner space that collects the powder discharged through the outlet, wherein
an end portion of the delivery screw that is adjacent to the outlet protrudes outwardly from the powder storage through the outlet and resides in the inner space of the powder collection portion, and
the powder storage includes a vent through which air in the powder storage exits, a suction portion coupled to the vent and configured to suck the air, and a filter configured to catch the powder traveling toward the vent.

2. The powder collection unit according to claim 1, wherein the powder storage includes a storage tank and a protrusion having a tubular shape and protruding outwardly from the storage tank, and the outlet is an opening of the protrusion.

3. The powder collection unit according to claim 1, wherein the delivery screw is configured to rotate with a distance from an inner surface of the protrusion and the distance is not less than 5 mm and not more than 10 mm.

4. The powder collection unit according to claim 1, wherein the powder collection portion is coupled to an outer surface of the protrusion.

5. The powder collection unit according to claim 1, wherein the powder collection portion is a flexible bag.

6. The powder collection unit according to claim 1, wherein the powder collection portion is airtight.

7. The powder collection unit according to claim 1, wherein the rotation axis of the delivery screw is tilted with respect to a vertical direction.

8. The powder collection unit according to claim 1, wherein the delivery screw has a helical thread, and a pitch of the helical thread in a direction along the rotation axis is not less than 15 mm and not more than 30 mm.

9. The powder collection unit according to claim 1, further comprising a driver configured to rotate the delivery screw and a detector configured to determine a load on the driver.

10. A fiber processing apparatus comprising:

a defibrator configured to defibrate a raw material containing fibers;

an accumulator configured to disperse a defibrated substance generated by the defibrator in air and perform suction to accumulate the defibrated substance; and the powder collection unit according to claim 1 configured to collect powder including the fibers sucked by the accumulator.

* * * * *